April 7, 1959 L. P. BRUST 2,881,022
ARTICLE-HANDLING DEVICE
Filed May 22, 1956
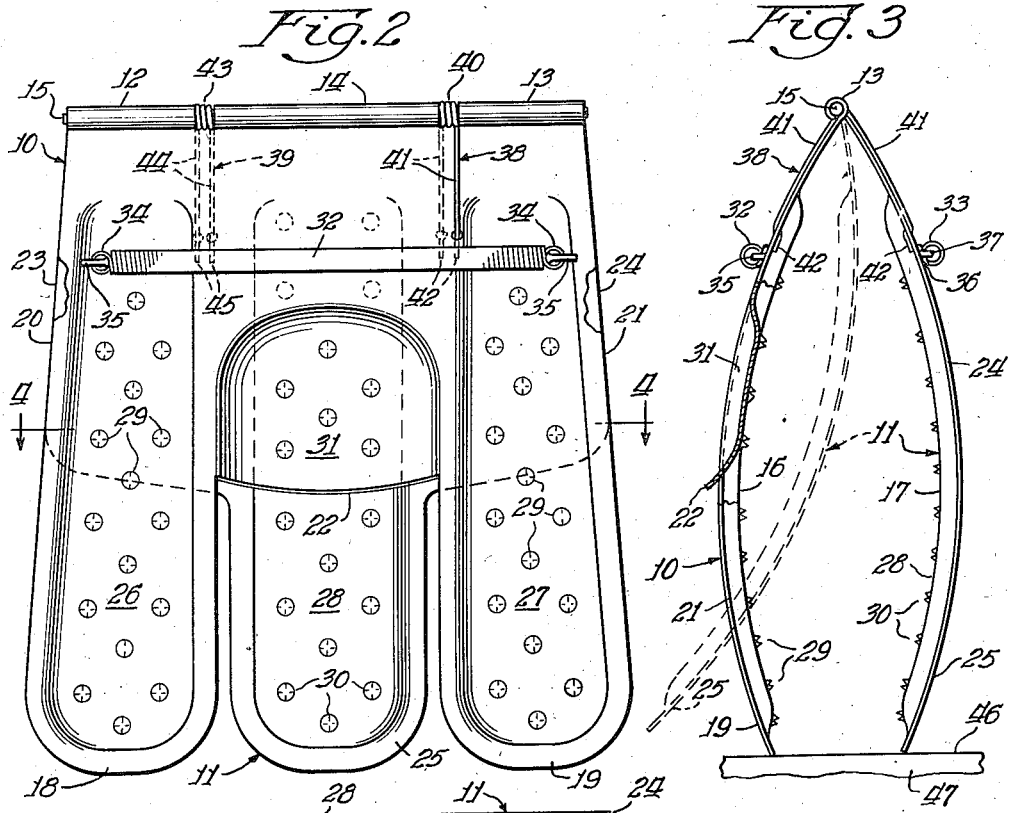
Inventor:
Leonard P. Brust
By: H. J. Schmid Atty.

United States Patent Office 2,881,022
Patented Apr. 7, 1959

2,881,022
ARTICLE-HANDLING DEVICE
Leonard P. Brust, Melrose Park, Ill.
Application May 22, 1956, Serial No. 586,450
3 Claims. (Cl. 294—16)

This invention relates to article-gripping devices and more particularly to devices for gripping and handling fish and the like.

In the sport of fishing, considerable difficulty is encountered in holding captured fish by the sportsman due to the fact that fish are covered by a protective slippery film rendering the sportsman frequently incapable of gripping the fish and which may result in the loss of the fish during the attempt to extract the hook from the fish. Furthermore, during the hook-extracting operation, painful injuries to the hands of the sportsman may occur by the dorsal fins, gills and teeth of the fish lacerating or piercing the hands in the whipping and thrashing efforts of the fish to free itself, particularly in the case of catfish and other fish having projecting spines and barbs. These difficulties in controlling the fish to safely hold and retain the fish are substantially aggravated when the fish are of large dimensions, for example, pike and bass of legally keepable size.

An object of the invention is to provide an improved article-gripping device.

Another object of the invention is to provide an improved device for gripping and securely holding articles and capable of accommodating articles of different sizes.

Another object of the invention is to provide an improved article-gripping device having spring means for holding and retaining the device in the hand of the sportsman during use.

Another object of the invention is to provide an improved article-gripping device formed of a pair of sheet metal members having a hinged connection at adjacent ends thereof and a plurality of fingers capable of intercalation for securely holding and retaining articles of different sizes.

A further object of the invention is to provide an improved fish holding and retaining device enabling the sportsman to safely and easily remove hooks and plugs from the fish while gripping the fish to prevent escape thereof.

A still further object of the invention is to provide a device as described which is simple in construction, readily manufactured, easily and conveniently carried, and formed to be available for immediate use.

These and other objects of the invention will become apparent and be best understood from a consideration of the following detailed description taken in connection with the accompanying drawing, forming part of this specification, and in which like figures of reference identify corresponding parts in the various views, it being understood that changes and modifications may be made without departing from the spirit and scope of the invention as defined in the appended claims.

In the drawing:

Fig. 1 is a perspective view of the device embodying the present invention, showing the manner in which the device is used in holding a fish;

Fig. 2 is a view in side elevation of the device;

Fig. 3 is an end view of the device, a portion of which is broken away and shown in section to better illustrate the structure; and Fig. 4 is a section taken on line 4—4 of Fig. 2.

Referring to the drawing, it will be seen that the article-gripping device embodying the present invention comprises the two main body members 10 and 11, preferably formed of any suitable strong and rigid material which may be sheet metal, such as aluminum or stainless steel or other non-rusting metal.

Each of the two body members 10 and 11 are arcuately curved, as seen in Fig. 3 with the member 10 being of generally U-shape and the member 11 being generally T-shaped, and are hingedly connected together by one end of the body member 10, defining the base of the U-shaped member 10, having integral rolled portions of the edge of the body defining spaced cylindrical sleeves 12 and 13 in alignment and by the one end of the body member 11, defining the cross-arm of the T-shaped member 11, having an integral rolled portion providing a single cylindrical sleeve 14 interposed between the two sleeves 12 and 13, the sleeve 14 being aligned with the sleeves 12 and 13 for receiving a hinge pin 15 extending transversely of the members and effective to pivotally connect or couple together the members 12 and 13 for relative oscillatory movement about an axis of the hinge pin. The sleeve 14 of the member 11 is in spaced relation to the sleeves 12 and 13 of the member 10 for a purpose to be described.

The two arcuately curved body members 10 and 11 have confronting concave sides 16 and 17 defining an oval opening therebetween, conforming to the sides of a fish, as seen in Figs. 1 and 3. The arms of the U-shaped member 10 defines a plurality of fingers 18 and 19 in spaced relation with the sides of the member aligning with the remote sides of the fingers to define edges 20 and 21 of the member disposed at an angle relative to each other converging toward the hinge connection of the member 10 with the member 11. The fingers 18 and 19 merge with the main portion of the member 10 and are connected thereat by a convexly curved edge 22 as shown in Fig. 2. The member 11 has its sides 23 and 24 aligned with the sides of the member 10 and the leg of the T-shaped member 11 defining a finger 25 projecting midway between its side edges from the main portion thereof and is formed to be received between the fingers 18 and 19 of the member 10 when the members 10 and 11 are moved relatively toward each other about their hinged connection so that the member 11 may assume the position with respect to the fingers 18 and 19, as seen in Fig. 3, and until such movement is prevented by the finger 25 engaging the edge 22 of the member 10 between the fingers 18 and 19 of the member 11.

To provide rigidity to the sheet metal body members and the fingers thereof, the fingers 18 and 19 of the member 10 are provided with longitudinal recesses or depressions 26 and 27 and extending into the main portion of the body member 11 and the finger 25 also is formed with a longitudinal recess or depression 28 extending into the main portion of the body member 11. These depressions in the members 10 and 11 may be said to form inwardly directed ribs which are of substantial area and these ribs are provided with struckout projections 29 and 30 respectively, punched in the metal forming the same by a pointed tool perforating the metal to provide teeth adapted to be pressed into an article, such as the sides of a fish as shown in Fig. 1.

The projections or teeth 29 and 30 of the body members 10 and 11 are spaced over the entire confronting surface areas of these members including the fingers 18, 19 and 25 and, when pressed into the sides of a fish during closing movement of the members 10 and 11, serve to firmly grip the fish. In the event very small fish are grasped, or should the user fail to grip the fish when attempting to do so, the finger 25 of the member 11 may be moved by the thumb of the user between the spaced fingers 18 and 19 of the member 10 when the member 10 is engaged by the fingers of the user, as shown in Fig. 1. To avoid any possibility of injury to the user's hand, by the teeth 30 on the finger 28 of the body member 11 engaging the fingers of the hand, the edge 22 of the member 10 between the fingers 18 and 19 is spaced from the hinge 15 a predetermined distance equal to or substantially the length of the fingers of the hand to thus provide a stop 22 rendering the teeth 30 on the finger 28 incapable of engaging the fingers of the hand.

To facilitate the device gripping the article by the hand, the body member 10 is provided with a recess 31 therein, centrally thereof and at the juncture of the fingers 18 and 19 for receiving the thumb of the hand, and the depressions in the member 11 are effective to assist in the fingers of the hand engaging the device during gripping of the article.

To position and hold the device on the hand during use, spring means are provided for holding and retaining the device on the hand. More particularly, the body members 10 and 11 are provided with coil springs 32 and 33 extending transversely thereof adjacent the hinge connection, the spring 32 having its opposite ends formed to provide loops 34 and 34 receivable in tangs 35, 35 struck from and extending outwardly of the member 10 and engaging the tangs to anchor the spring ends to the member 10, and the spring 33 also having end loops 36, 36 receivable in tangs 37, 37 in the member 11 and engaging the tangs to secure the spring ends to the member 11, the tangs of the members being sufficiently spaced so that the coil springs are held in tension by the members but capable of flexing to permit the fingers and thumb to be received between the springs and the members and to be firmly held thereby to insure retention of the device in the hand of the user and particularly during manipulation of the device during spreading movement of the members to receive the article and during closing movement to grip the article. It is contemplated that, if desired, the loops 34, 34 of the spring 32 and the loops 36, 36 of the spring 33 may be secured to the respective body members 10 and 11, in the position shown, by headed rivets extending through the loops of the springs and opening in the body members and with the ends of the rivets upset to connect the springs to the body members.

The members 10 and 11 of the device are normally held apart and in spaced relation from each other by torsion springs 38 and 39, the spring 38 having a loop portion 40 surrounding the hinge pin at one end of the hinge sleeve 14 of the member 11 and between this end and the adjacent end of the hinge sleeve 13 of the member 10, the spaced legs 41, 41 of the spring extending exteriorly of the members and having their ends 42, 42 offset, received within openings in the members, and engaging the interior concave sides 16 and 17 of the members 10 and 11. The spring 37 has a loop portion 43 surrounding the hinge pin 15 at the other end of the hinge sleeve 14 of the member 11 and between this end and the adjacent end of the hinge sleeve 12, the spaced legs 44, 44 of the spring extending interiorly of the members 10 and 11 and having their ends 45, 45 offset and received within openings in the members, and engaging the exterior surfaces of the members 10 and 11. The springs 38 and 39 normally act to provide spring forces effective to spread and hold apart the members for facilitating insertion of the article, such as a fish as shown in Fig. 1, between the members when the device is held in the hand. This feature is also advantageous as the members, normally held in spaced relation by the springs 38 and 39, as shown and permit the device to be supported in an upright position on the ends of the fingers of the members 10 and 11 on a flat surface 46, for example, on the seat 47 of a boat, for ready insertion of the hand between the springs 32 and 33 and the body members and for manipulation by the hand to hold the article.

It will be noted that, due to the fact that the springs 32 and 33 are located on the members near the hinge connection of the members and that the springs 38 and 39 constantly force the members apart, the device is urged into the palm of the hand and will be retained therein during use of the device.

An important feature of the invention resides in its application to grip and hold articles of different sizes, such as fish of large and small sizes. The body members 10 and 11 may be spread apart sufficiently to provide space therebetween to receive and grip fish of substantial size such as pike or bass. Frequently, fish of small size, as perch, are hooked and the device is adapted to receive and grip such fish for removal of the hook from the fish, as the body members 10 and 11 of the device may be moved relatively toward each other to position the member 11 with respect to the member 10 as shown in dotted lines in Fig. 3. This advantageous characteristic of the device is realized due to the fact that the finger 25 of the body member 11 may be moved and positioned between the fingers 18 and 19 of the member 10 to provide an oval opening of varying size conforming to the small size of the fish to be gripped by the device.

The foregoing description and accompanying drawing are believed to clearly disclose a preferred embodiment of the invention, however, it is to be understood that this disclosure is merely illustrative and that such changes in the invention may be made as are fairly within the scope and spirit of the appended claims.

I claim:

1. A fish gripping device comprising first generally U-shaped and second generally T-shaped arcuately curved sheet metal members with the base of the U-shaped member and the cross-piece of the T-shaped member having adjacent ends hingedly connected together to position concave sides thereof in confronting relationship to define an oval opening therebetween, the arms of said U-shaped member providing spaced fingers and the leg of said T-shaped member providing a finger movable between said spaced fingers to grip fish of different sizes between said members and engageable with a stop edge afforded by said U-shaped member at the juncture of said spaced fingers thereof to limit movement of said members toward each other, said fingers and the confronting sides of said members having teeth engageable with the fish, and said stop edge on said U-shaped member being generally midway between the hinge connection of said members and the tips of said fingers to provide considerable variations in size of said oval opening during reception and movement of the finger of the T-shaped member between the spaced fingers of the U-shaped member to capture and securely hold fish of different sizes between said members and the fingers thereof, said stop edge on said U-shaped member being spaced from the hinge connection of said members a predetermined distance substantially the length of the fingers of a hand to prevent engagement of the teeth on the finger of said T-shaped member with the fingers of a hand in engagement with said U-shaped member.

2. In a fish gripping device as defined in claim 1 wherein said fingers define an area substantially the entire width of the device with the sides of the finger of said T-shaped member lying close to the adjacent sides of the spaced fingers of said U-shaped member to provide a maximum fish gripping area.

3. In a fish gripping device as defined in claim 1 wherein each of said members have coil springs extending transversely of said members and disposed between said hinge connection and said fingers and connected respectively to said members, said springs being expandable to accommodate hands of different sizes and operative to provide spring force to hold the fingers and thumb of a hand in engagement with said members.

References Cited in the file of this patent

UNITED STATES PATENTS

| | | | |
|---|---|---|---|
| 223,066 | Russell | Dec. 30, | 1879 |
| 621,379 | Shoffner | Mar. 21, | 1899 |
| 941,798 | Moore | Nov. 30, | 1909 |
| 1,083,786 | Young | Jan. 6, | 1914 |
| 1,499,753 | Skoog | July 1, | 1924 |
| 1,540,694 | Herrick | June 2, | 1925 |
| 1,976,977 | Zinky | Oct. 16, | 1934 |
| 2,199,300 | Beletic | Apr. 30, | 1940 |
| 2,244,072 | Ledbetter | June 3, | 1941 |
| 2,392,118 | Cacarillo | Jan. 1, | 1946 |
| 2,601,766 | Riddell et al. | July 1, | 1952 |
| 2,757,951 | Benton | Aug. 7, | 1956 |